(12) United States Patent
Abraham et al.

(10) Patent No.: US 8,107,100 B2
(45) Date of Patent: Jan. 31, 2012

(54) POST DEPLOYMENT ELECTRONIC DOCUMENT MANAGEMENT AND SECURITY SOLUTION

(75) Inventors: Subil M. Abraham, Plano, TX (US); Tsz S. Cheng, Grand Prairie, TX (US); Daniel Hassell, Flower Mound, TX (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/459,012

(22) Filed: Jul. 20, 2006

(65) Prior Publication Data
US 2008/0018926 A1    Jan. 24, 2008

(51) Int. Cl.
*G06K 15/00* (2006.01)
*H04N 1/00* (2006.01)
*H04L 29/06* (2006.01)
*G06F 21/00* (2006.01)

(52) U.S. Cl. ....... 358/1.14; 358/403; 713/150; 713/166; 705/51

(58) Field of Classification Search .................. 358/1.14, 358/403; 713/150, 166; 705/51
See application file for complete search history.

(56) References Cited

U.S. PATENT DOCUMENTS

| | | | |
|---|---|---|---|
| 6,948,122 B2 * | 9/2005 | Matsumoto | 715/272 |
| 2002/0073202 A1 | 6/2002 | Wang | |
| 2002/0112184 A1 | 8/2002 | Hall et al. | |
| 2004/0117655 A1 * | 6/2004 | Someshwar | 713/201 |
| 2004/0236862 A1 | 11/2004 | Ito et al. | |
| 2005/0086213 A1 | 4/2005 | Terao | |
| 2005/0131830 A1 * | 6/2005 | Juarez et al. | 705/51 |
| 2005/0138188 A1 | 6/2005 | Nassor et al. | |
| 2006/0173999 A1 * | 8/2006 | Rider et al. | 709/225 |

FOREIGN PATENT DOCUMENTS

| | | |
|---|---|---|
| JP | 2000181908 | 6/2000 |
| JP | 2004046460 | 2/2004 |
| JP | 2005063238 | 3/2005 |
| KR | 2003050640 | 11/2004 |

* cited by examiner

*Primary Examiner* — Thomas Lett
(74) *Attorney, Agent, or Firm* — Patents on Demand P.A.; Brian K. Buchheit; Scott M. Garrett (57) ABSTRACT

A method for managing deployed electronic documents that can begin when the deployed electronic document is accessed. A data probe can be automatically conveyed to a remotely located document manager responsive to the access attempt. The data probe can include data specific to the deployed electronic document. A management command can be received from the document manager. At least one management action can be locally and automatically performed for the deployed electronic document in accordance with the received management command. The management action can alter the content of the deployed electronic document and/or access rights to existing content of the deployed electronic document.

20 Claims, 6 Drawing Sheets

POST DEPLOYMENT ELECTRONIC DOCUMENT MANAGEMENT AND SECURITY SOLUTION

BACKGROUND

1. Field of the Invention

The present invention relates to the field of electronic document management and, more particularly, a management solution for electronic documents which can be utilized after the document has been deployed.

2. Description of the Related Art

Electronic documents are a cornerstone of digital computing. These documents cover a wide variety of types and purposes—from the spreadsheets and word processing documents used in daily business activities to digital music and video files used for leisure. Organizations often use a variety of electronic documents to calculate, present, and store information that is vital for daily business functions. Advances in personal electronics even allow electronic documents to be created and/or received by an abundance of devices, such as mobile phones and personal data assistants (PDAs).

Since electronic documents contain such a vast amount of important information, security is a significant concern. In order to address this issue, many different techniques have been developed to protect electronic documents. Using one technique, an electronic document can be encrypted via an encryption algorithm. Although effective for preventing unauthorized viewing by those without the proper decrypting algorithm, this method is unable to provide fine-grained permission control over an electronic document. Additionally, encryption is an "all or nothing" form of protection; either all data sections of the document are encrypted or none. The protection of the document ceases once it is decrypted. Further, a decrypted document can be copied and sent to others. Therefore, the original owner loses control of the electronic document once it has been deployed and decrypted.

Another technique often used for protecting documents utilizes server-based protections assigned by a file server. The most common practice of this technique is the use of file permissions available through the server's operating system. However, once the document is removed from the server and/or server-controlled environment and is deployed to a remote device, as in an email attachment, for example, the protection afforded by the server's permissions ceases. The document is again vulnerable to unauthorized access and use.

Online collaborative systems attempt to address the shortcomings of encryption and server permissions by creating a self-contained working environment for electronic documents. Like server protection, these systems are good at protecting documents only if the documents remain within the self-contained environment. Since access to the documents is controlled by the system, users are unable to access documents when not connected to the system, typically requiring some form of network access. Users are further inconvenienced by being forced to use the tools or applications provided by the system.

Furthermore, these conventional techniques are often limited to a specific operating environment or platform and to particular types of supported electronic documents. They lack the ability to apply access at varying granularities to designated sections of data contained within the electronic document, regardless of the accessing application.

Security is not the only issue with electronic documents management that results from the shortcomings expressed above. Other management challenges exist for deployed electronic documents, such as coordinating changes among multiple deployed copies of an electronic document, applying user specific settings to an electronic document accessed by multiple different users, rescinding already disseminated electronic documents, updating material contained within deployed electronic documents, and the like. The fundamental problem with existing systems is that control over an electronic document is surrendered once the document has been deployed.

SUMMARY OF THE INVENTION

The present invention discloses a document management and security solution for managing deployed electronic documents. Deployed electronic documents can include one or more data sections, each section being associated with section-specific content, access levels, and other properties. Content, access rights, and the like can be remotely accessed and/or modified by a document manager. A series of offline settings can be established for the deployed electronic documents so that the documents can be locally accessed (in accordance with the offline settings) when a connection to the document manager is unavailable.

In one embodiment, the access rights, content, and other properties of deployed electronic documents can be dynamically changed at any time by an authorized administrator of the document manager. For example, even if a particular user was previously granted read access for each section of a document, these permissions can be revoked or changed. The next time that user attempts to access the deployed document, the remotely located document manager can be accessed and current rights determined. If the document is presently "unlocked", the server can issue a command that locks the document. Otherwise, if the document is "locked" and awaiting rights, the server can refuse to grant access rights, which were previously permitted.

The present invention can be implemented in accordance with numerous aspects consistent with material presented herein. For example, one aspect of the present invention can include a method for managing deployed electronic documents. The method can begin when the deployed electronic document is accessed. A data probe can be automatically conveyed to a remotely located document manager responsive to the access attempt. The data probe can include data specific to the deployed electronic document. A management command can be received from the document manager. At least one management action can be locally and automatically performed for the deployed electronic document in accordance with the received management command. The management action can alter the content of the deployed electronic document and/or access rights to existing content of the deployed electronic document.

Another aspect of the present invention can include a different method for managing deployed electronic documents that begins when such a document is accessed. A request for access rights can be sent to a remote document manager. Once access rights are received from the document manager, they can be compared to the access levels of the deployed electronic document. Access to the contents of the deployed electronic document can be granted based on the results of the comparison.

Yet another aspect of the present invention can include a network managed document. This document can include a plurality of data sections, each section including content, and a plurality of section-specific access levels. Access can be selectively granted to the data sections based upon comparisons between the associated section-specific access levels and the access rights granted by a remotely located document manager.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
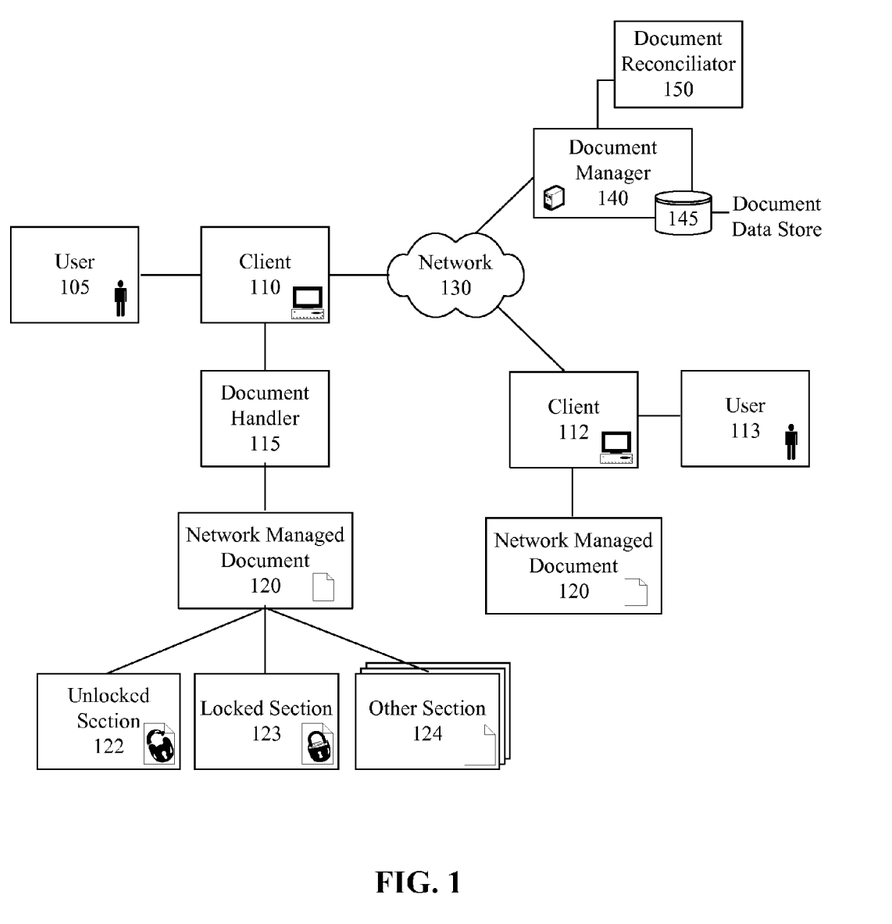
FIG. 1 is a schematic diagram illustrating a system for managing and securing deployed electronic documents in accordance with embodiments of the inventive arrangements disclosed herein.

FIG. 1 is a schematic diagram illustrating a system 100 for managing and securing deployed electronic documents in accordance with embodiments of the inventive arrangements disclosed herein. System 100 can include network managed document 120, document handler 115, and document manager 140 communicatively linked through network 130.

Network managed document 120 can be an electronic document, which can be managed after being deployed using document manager 140. Content, access rights, metadata, and other properties for the networked managed document 120 can be managed. Each network managed document 120 can be any of a variety of electronic documents including, but not limited to, a word processing document, a spreadsheet, a graphics file, a video file, a music file, and the like.

Network managed document 120 can contain multiple sections that have section specific content, access controls, and metadata which can be managed on a section-by-section basis. For example, content for one of the sections can be updated in accordance with a management command issued by document manager 140, while a different section can remain unchanged. Similarly, one or more sections can be locked 123 to deny local access to contents of the associated section, while different sections can be unlocked 122 to permit access. In another example, a user 105 can be granted read privileges on one of the other sections 124 and delete privileges on a different section 124.

Different users 105 can be granted different privileges for that document. For example, contents of locked section 123 can be available to a different user, even if that user is accessing the same document 120 using the same client 110. Changes to document sections 122-124 can occur dynamically and automatically based upon directions from the management server 140. For example, the contents of locked section 123 can become available to user 105 if user 105 possess the proper access rights as verified by document manager 140 or if the access level for locked section 123 is modified within document manager 140 such that the current access rights of user 105 are sufficient for access.

Document handler 115 can be a software application capable of displaying and/or modifying the specific file type of network managed document 120 and running on client 110. Document handler 115 can be any of a variety of software application types including, but not limited to, a thin client, a client application, a local stand-alone application, a web-based application, an applet, and the like.

In one embodiment, all code necessary for coordinating with document manager 140 can be embedded inside the network managed document 120. In another embodiment, the document handler 115 can include code to coordinate with the document manager 140. In still another embodiment, a deployed document engine (not shown) can be a necessary component placed between the document handler 115 and document 120, which locally handles communications and operations relating to the document manager 140. In such an embodiment, the network managed document 120 can be constructed so that direct access by document handler 115 is not permitted without the intervention of the deployed document engine.

Client 110 and/or client 112 can be any of a variety of computing devices including, but not limited to, a personal computer, a kiosk, a personal data assistant (PDA), a mobile phone, and the like. The client 110 can submit data across network 130 to document manager 140 in the form of data probes. A data probe can be sent responsive to occurrences of events relating to document 120, such as an attempt to access the document 120, an attempt to close the document 120, and the like.

Document manager 140 can be any of a variety of network devices including, but not limited to, a network server, a document management server, a file server, a web server, and the like. Contained within or connected to document manager 140 are document data store 145 and document reconciliator 150.

Document reconciliator 150 can include a set of machine-readable instructions for determining how to reconcile changes made to the content of network managed document 120 by users 105 and 113. User 113 can utilize client 112 communicatively linked to server 140 via network 130. Document reconciliator 150 can be implemented in a variety of manners including, but not limited to, a web service, a server application, a client application, a document management application plug-in component, and the like. Document reconciliator 150 can access document data store 145, which can contain the latest version of network managed document 120 and its access level requirements.

Interaction among the components of system 100 can be clarified through an example as follows. It should be appreciated that the following example is for illustrative purposes only and that the invention should not be construed as limited to the specific arrangements used within. In the example, user 105 is attempting to access locked section 123 of network managed document 120 via document handler 115 running on client 110. Document handler 115 is unable to open locked section 123 and must connect to document manager 140, via network 130 to obtain the access rights of user 105 to locked section 123. Desired rights can be included in a data probe, which can also include identification and authorization information for user 105, client 110, handler 115, and/or document 120.

The document manager 140 can receive and process the data probe. While processing the data probe, the document manager 140 can detect that a change in content has been logged for network managed document 120. Document manager 140 can then invoke document reconciliator 150 to reconcile the differences in content. The results of the reconciliation can be sent back to document handler 115 along with the access rights information, both of which can be contained within management commands. The management commands can specify a manner in which the access rights and reconciled content are to be applied by client 110. Client 110 can dynamically and automatically execute one or more management actions in accordance with the management commands. For example, the client 110 can automatically execute a content update action that updates document 120 as per the reconciliation. A different management command can unlock section 123, assuming that unlocking rights were granted by an associated management command.

Network 130 can include any hardware/software/and firmware necessary to convey data encoded within carrier waves. Data can be contained within analog or digital signals and conveyed though data or voice channels. Network 130 can include local components and data pathways necessary for communications to be exchanged among computing device components and between integrated device components and peripheral devices. Network 130 can also include network equipment, such as routers, data lines, hubs, and intermediary servers which together form a data network, such as the Internet. Network 130 can also include circuit-based communication components and mobile communication components, such as telephony switches, modems, cellular communication towers, and the like. Network 130 can include line based and/or wireless communication pathways Data store 145 can be a physical or virtual storage spaces configured to store digital information. Data store 145 can be physically implemented within any type of hardware including, but not limited to, a magnetic disk, an optical disk, a semiconductor memory, a digitally encoded plastic memory, a holographic memory, or any other recording medium. Data store 145 can be a stand-alone storage unit as well as a storage unit formed from a plurality of physical devices. Additionally, information can be stored within data store 145 in a variety of manners. For example, information can be stored within a relational database structure or can be stored within one or more files of a file storage system, where each file may or may not be indexed for information searching purposes. Further, data store 145 can utilize one or more encryption mechanisms to protect stored information from unauthorized access.

Figure 2:
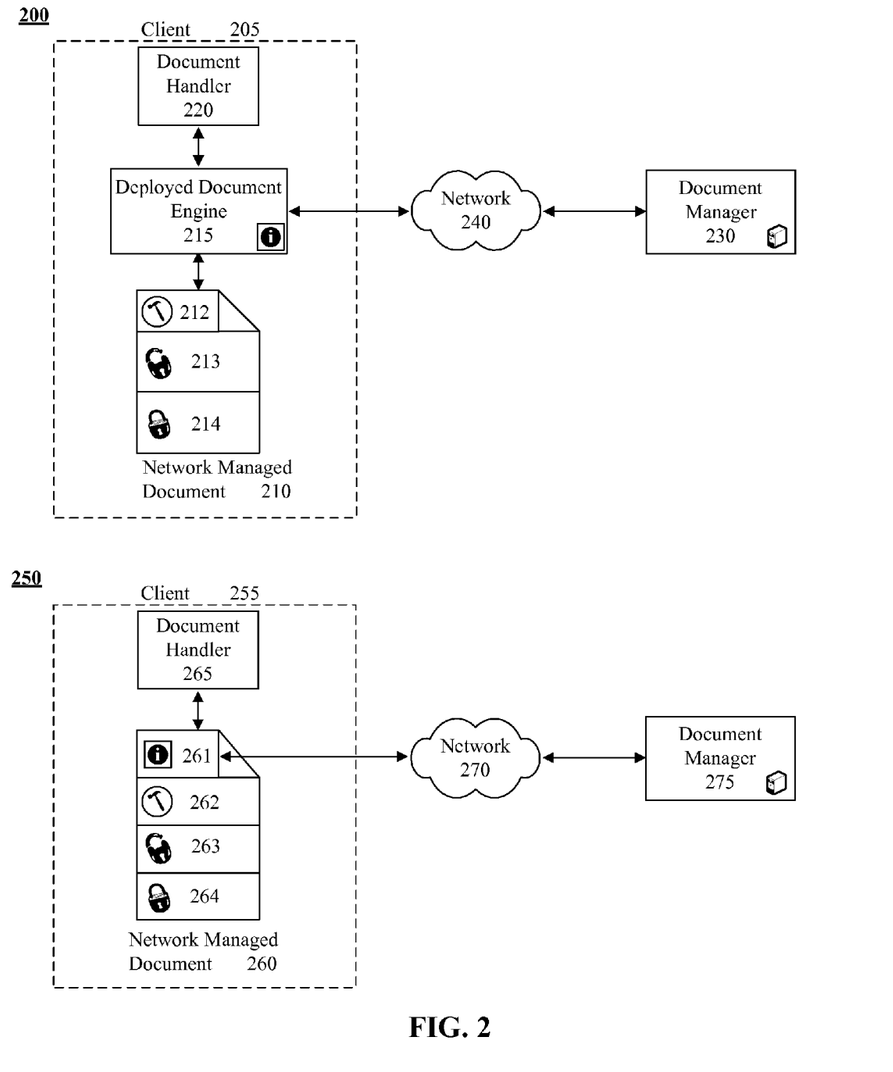
FIG. 2 is a schematic diagram of two systems for communicating remotely issued management commands in deployed electronic documents in accordance with an embodiment of the inventive arrangements disclosed herein.

FIG. 2 is a schematic diagram of two systems 200 and 250 for communicating remotely issued management commands in deployed electronic documents in accordance with an embodiment of the inventive arrangements disclosed herein. Systems 200 and 250 can be performed in the context of system 100. Systems 200 and 250 are not limited in this regard, however, and can be performed in the context of any system supporting network managed documents.

In system 200, client 205 interacts with document manager 230 via network 240. Contained in client 205 are document handler 220, deployed document engine 215, and network managed document 210. Further, network managed document 210 can include configuration data 212, unlocked section 213, and locked section 214.

It should be appreciated that other sections can be included in the document 210 and that sections 213-214 are presented to illustrate a simple locking/unlocking functionality provided by the present invention. The invention can be used to perform any type of remotely managed action and is not limited to basic security actions, such as locking and unlocking document sections, which are provided to illustrate a more general concept expressed and claimed herein.

In system 200, when a user of client 205 attempts to access locked section 214 of network managed document 210, access rights must be requested from document manager 230. This transmission occurs over the connection between client 205 and network 240. Deployed document engine 215 can be a proxy imposed between handler 220 and document 210 that manages document-based interactions between the client 205 and document manager 230. The deployed document engine 215 can include document handling instructions, which are used to construct a data probe requesting access rights from manager 230.

Upon receipt of the access rights from document manager 230, engine 215 can determine if locked section 214 can be accessed. In order to make this determination, engine 215 can compare access level of locked section 214 against the access rights received from document manager 230. A favorable outcome of the comparison results in document handler 220 being allowed to access the contents of locked section 214.

Should the request for access rights go unanswered for a predetermined amount of time, which can occur when either client 205 or document manager 230 is disconnected from network 240, deployed document engine 215 can permit document handler 220 to access network managed document 210 with the set of access rights last verified by document manager 230. This set of access rights can be contained within configuration data 212 of network managed document 210.

In system 250, a set of embedded document handling instructions 261 can handle interactions between the client 255 and the document manager 275. Client 255 can interact with document manager 275 via network 270. Contained in client 255 are document handler 265 and network managed document 260. Further, network managed document 260 can include document handling instructions 261, configuration data 262, unlocked section 263, and locked section 264.

When a user of client 255 attempts to access locked section 264 of network managed document 260, access rights must be requested from document manager 275. This transmission can occur over the connection between client 255 and network 270. The request for access rights can be generated and sent by document handling instructions 261. Document handling instructions 261 can include a set of machine-readable instructions embedded within network managed document 260 for handling communications between document handler 265 and document manager 275. Document handling instructions 261 can be implemented in a variety of manners including, but not limited to, a set of microcode, an applet, a set of XML tags, an executable script, and the like.

Upon receipt of the access rights from document manager 275, document handling instructions 261 can determine if locked section 264 is able to be accessed. In order to make this determination, document handling instructions 261 can compare an access level of locked section 264 against the access rights received from document manager 275. A favorable outcome of the comparison can result in document handler 265 being allowed to access the contents of locked section 264.

Document handling instructions 261 can permits document handler 265 to access network managed document 260 using a set of offline-access rights should a connection between client 255 and document manager 275 be unavailable. The offline access right can, for example, be a set of access rights last verified by document manager 275. The rights can be contained within configuration data 262 of network managed document 260.

Figure 3:
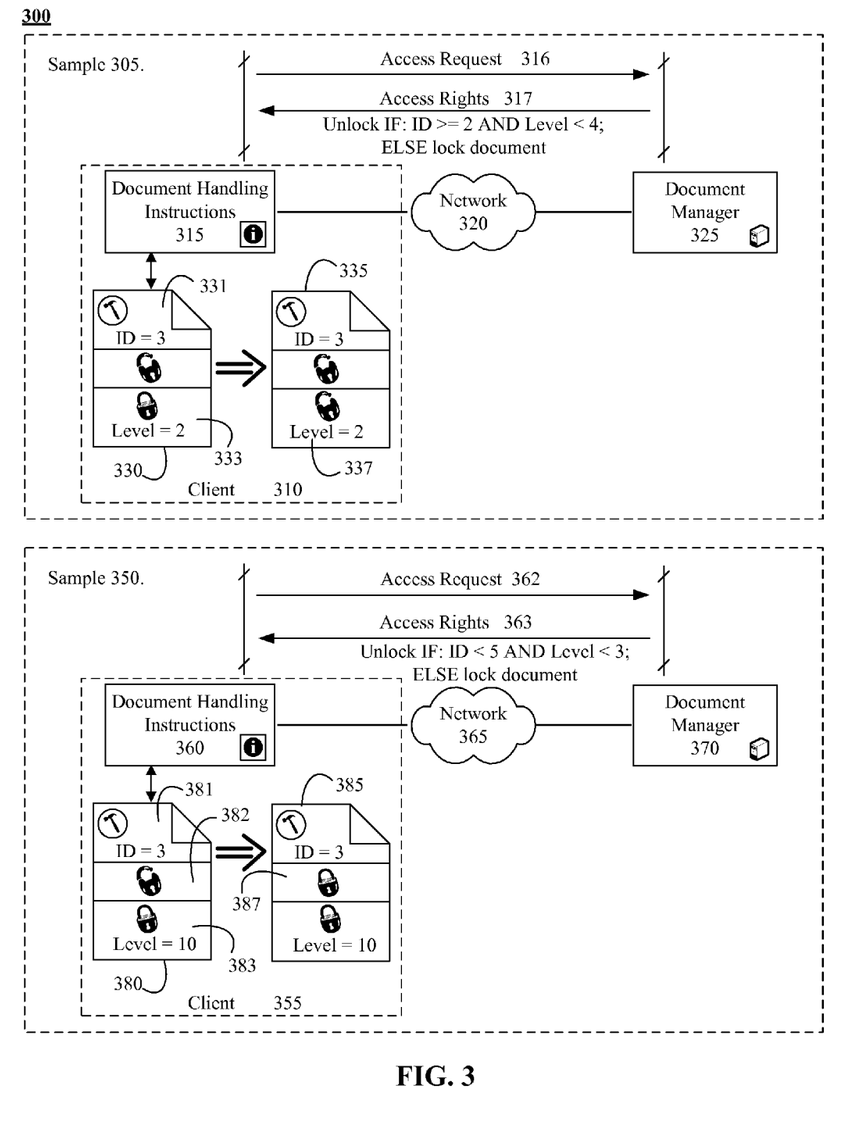
FIG. 3 illustrates a collection of sample access scenarios in accordance with an embodiment of the inventive arrangements disclosed herein.

FIG. 3 illustrates a collection 300 of sample access scenarios in accordance with an embodiment of the inventive arrangements disclosed herein. The samples of collection 300 can be performed in the context of systems 100, 200, and 250. The samples of collection 300 are not limited in this regard, however, and can be performed in the context of any system supporting network managed documents. The samples focus upon the locking/unlocking for sections as discussed in system 200. The principles expressed in the samples can be easily adapted for any type of management action.

Samples 305 and 350 focus on the affect of the communicated information upon the content of a network managed document. As such, system components that are vital to the system as a whole but not this specific aspect have been removed to emphasize this portion of the process.

Sample 305 includes client 310, network 320, and document manager 325. Client 310 contains document handling instructions 315 and network managed document 330. Network managed document 330 contains configuration data 331 and locked section 333.

When access of locked section 333 is attempted, document handling instructions 315 sends access request 316 across network 320 to document manager 325. The access request 316 can be sent as part of a data probe. Included in access request 316 is client identification information. In this sample, the value of the variable ID, contained within configuration data 331, is sent. It should be appreciated that client identification information can be gathered in a variety of manners including, but not limited to, an embedded variable value, a system variable value, a user entered datum, a value contained in a local file, and the like.

Document manager 325 sends access rights 317 to document handling instructions 315 via network 320. The access rights can be contained within one or more management commands issued in response to the data probe. Access rights 317 can contain the access rights associated with the section being accessed, other access information overriding the existing access status, and changes in content of the document. In this example, access rights 317 contains information stating that the document section should be unlocked if ID greater than or equal to 2 and the access level is less than 4; otherwise the section should remain locked. It should be appreciated that this is an example of only a possible implementation of access rights information.

Upon receipt of access rights 317, document handling instructions 315 uses the information to determine if locked section 333 should be accessed. In this example, the access rights information evaluates as TRUE, resulting in network managed document 335. Previously locked section 333 is now unlocked 337.

Sample 350 includes client 355, network 365, and document manager 370. Client 355 contains document handling instructions 360 and network managed document 380. Network managed document 380 contains configuration data 381, unlocked section 382, and locked section 383.

When access of locked section 383 is attempted, document handling instructions 360 sends access request 362 across network 365 to document manager 370. Included in access request 362 is client identification information. In this sample, the value of the variable ID, contained within configuration data 381, is sent. It should be appreciated that client identification information can be gathered in a variety of manners including, but not limited to, an embedded variable value, a system variable value, a user entered datum, a value contained in a local file, and the like.

Document manager 370 sends access rights 363 to document handling instructions 360 via network 365. Access rights 363 can contain the access rights associated with the section being accessed, other access information overriding the existing access status, and changes in content of the document. In this example, access rights 363 contains information stating that the document section should be unlocked if ID less than 5 and the access level is less than 3; otherwise the entire document should be locked.

Upon receipt of access rights 363, document handling instructions 360 uses the information to determine if locked section 383 should be accessed. In this example, the access rights information evaluates as FALSE, resulting in network managed document 385. Locked section 383 of network managed document 380 remains locked. Previously unlocked section 382 is now locked 387, rendering the contents of the entire document inaccessible.

Figure 4:
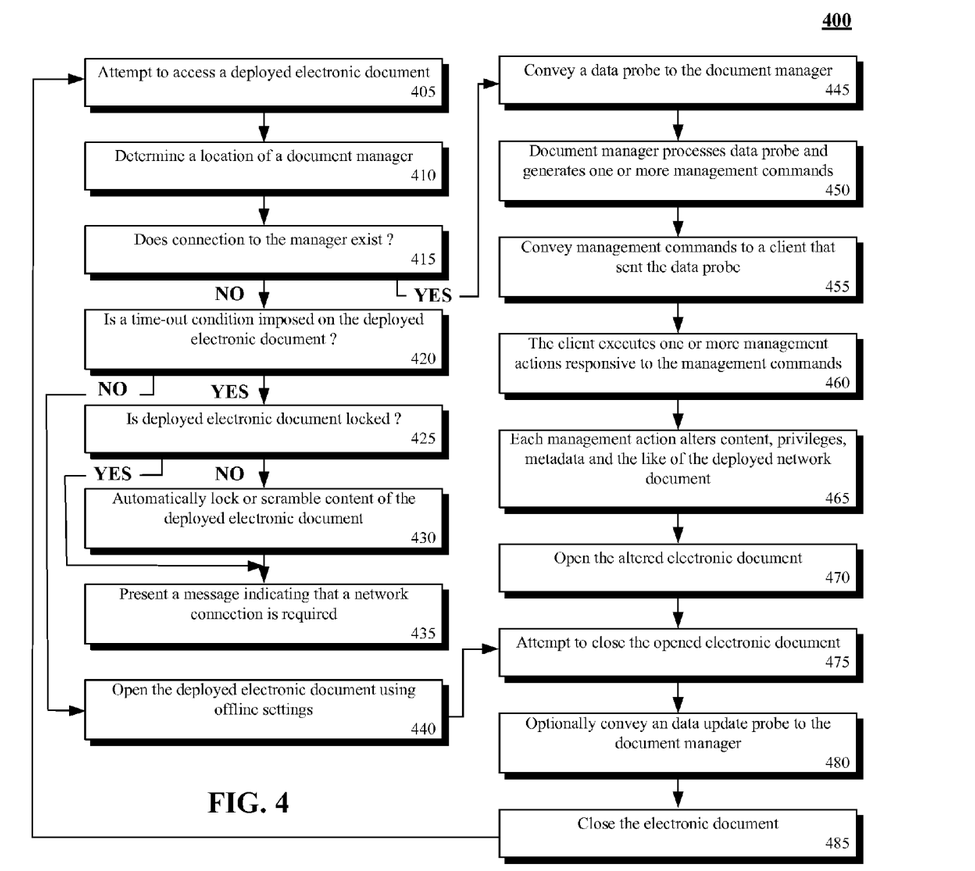
FIG. 4 is a flow chart of a method for managing deployed electronic documents in accordance with an embodiment of the inventive arrangements disclosed herein.

FIG. 4 is a flow chart of a method 400 for managing deployed electronic documents in accordance with an embodiment of the inventive arrangements disclosed herein. Method 400 can be performed in the context of system 100 or in the context of any other system allowing the management of deployed electronic documents.

Method 400 can begin in step 405, where an attempt can be made to access a deployed electronic document. In step 410, a location of a document manager can be determined. For example, metadata embedded in the electronic document can provide a URL address for a related document manager. In step 415, the method can determine if a connection to the document manager exists, if so the method can jump to step 445, where a data probe can be sent to the document manager.

If no connection exists, the method can progress to step 420, where the method can check for a time-out condition. When there is no time-out condition for the document, the method can jump to step 440, where the deployed electronic document can be opened using offline settings. Otherwise, the method can progress from step 420 to step 425, where the method can check whether the electronic document is locked. If it is not locked, the method can automatically lock or scramble content of the electronic document in step 430. Once the document is locked, step 435 can be performed, where a message can be presented that indicates a network connection is required before the document can be accessed. The method can then end until a network connection is established with the document manager.

In step 440, any number of offline settings can be applied to the electronic document. For example, the previously stored settings established the last time the electronic document was accessed can be used. In a different example, the offline settings can provide more restrictive (or otherwise different) access than that available when communications with a document manager are enabled. The method can progress from step 440 to step 475, when a user attempts to close a document. At a time of closing, an additional attempt can be made to connect to the document manager, as indicated by step 480.

In step 445, the data probe conveyed to the document manager can include document identifying information, such as metadata, current content, usage tracking information, and the like. The data probe can also include identifying information and/or authorizing information related to the user and/or client that are attempting to access the deployed electronic document. In step 450, the document manager can process the data probe and can generate one or more management commands. In step 455, the management commands can be conveyed to the client that sent the probe. The commands can include updated content, programmatic instructions executable by the client, and data directing the client to take one or more actions relating to the deployed document.

In step 460, the client can execute one or more management actions responsive to receiving the management commands. As shown in step 465, each management action can alter content, privileges, metadata, and the like. In step 470, the altered electronic document can be opened. In step 475, an attempt to close the document can be detected, which can occur after a user is finished utilizing the document. In step 480, a data update probe can be optionally sent to the document manager. Document usage information, content updates, and the like can be included in the data update probe. In step 485, the electronic document can be closed. The method can be repeated for a new deployed electronic document and can therefore loop from step 485 to step 405.

Figure 5:
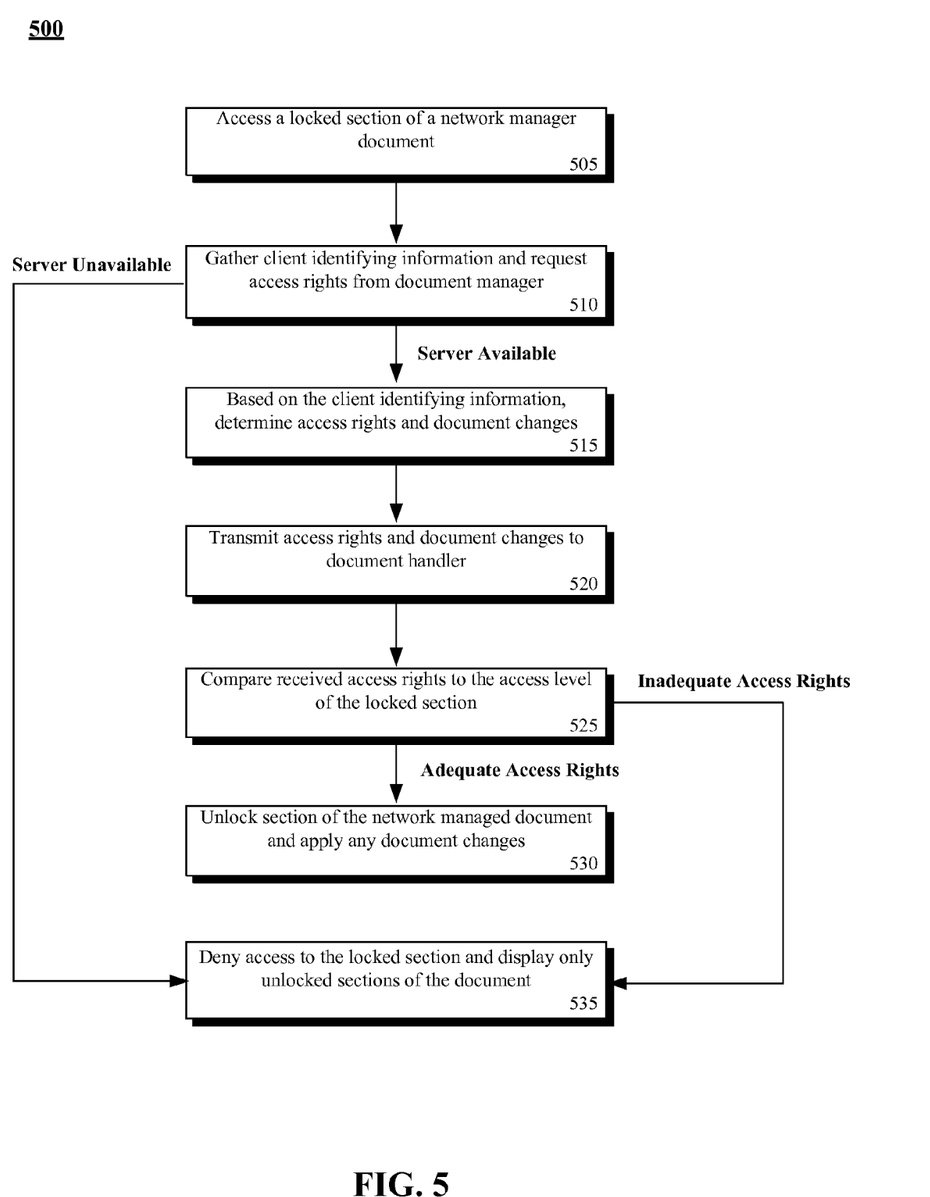
FIG. 5 is a flow chart of another method for managing deployed electronic documents in accordance with an embodiment of the inventive arrangements disclosed herein.

FIG. 5 is a flow chart of a method 500 for managing deployed electronic documents in accordance with an embodiment of the inventive arrangements disclosed herein. Method 500 can be considered a specific instance of method 400 relating to document security.

Method 500 can begin in step 505, where access to a locked section of a network managed document is attempted. In step 510, the system can gather client identifying information and can request access rights from the document manager. An example of client identifying information can be a value contained within an embedded variable of the network managed document, a permanent value unique to the client machine, a user entered datum, a value contained in a local file, and the like.

The next step performed depends upon the availability of the document manager. If the document manager is available, then step 515 can execute, where the document manager can determine the access rights and any content changes that correspond to the received client identifying information. This information can be transmitted back to the document handler in step 520.

Upon receipt of the access rights information, the document handler can compare the received access rights value against the access level of the locked section in step 525. Step 530 can occur if the value of the access rights meets the access level requirement of the locked section. In step 530, the locked section can be unlocked and any transmitted document changes can be applied.

In the event that the document manager is unavailable to receive the information from step 510, step 535 would execute, wherein the system can deny access to the locked section and only sections that are currently unlocked may be accessed. Step 535 also executes if the comparison of step 525 results in inadequate access rights to access the locked section.

Figure 6:
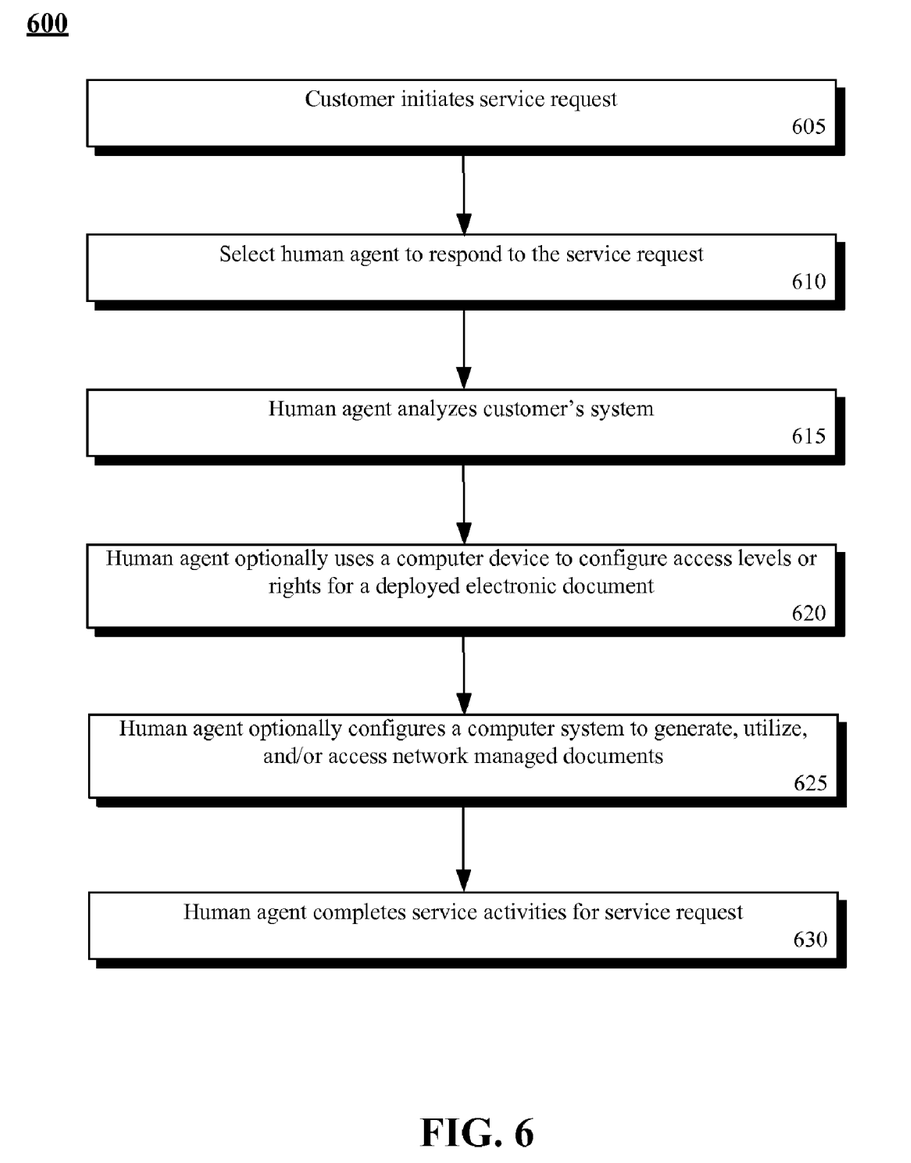
FIG. 6 is a flow chart of a method where a service agent can configure a system for managing and securing deployed electronic documents in accordance with an embodiment of the inventive arrangements disclosed herein.

FIG. 6 is a flow chart of a method 600 where a service agent can configure a system for managing and securing deployed electronic documents in accordance with an embodiment of the inventive arrangements disclosed herein. Method 600 can be preformed in the context of system 100, method 400, and/or method 500.

Method 600 can begin in step 605, when a customer initiates a service request. The service request can be a request for a service agent to establish a new system for managing deployed electronic documents. The service request can also be a request to troubleshoot a problem with an existing deployed document management system or to enhance a deployed document management system.

In step 610, a human agent can be selected to respond to the service request. In step 615, the human agent can analyze a customer's current system and can develop a solution. The solution can result in a system 100, 200, 250, or any system where deployed electronic documents are managed and secured, such as a system that performs the steps of method 400.

In step 620, the human agent can configure the customer's system to manage deployed electronic documents. In step 625, the human agent can optionally configure the customer's system to generate, utilize, and/or access network managed documents. The human agent can perform steps 620 and 625 and/or can configure a computing device of the customer in a manner that the customer or clients of the customer can perform steps 620 and 625 using the configured system in the future. For example, the service agent can load and configure software and hardware so that client devices will be capable of managing deployed electronic documents. In step 630, the human agent can complete the service activities.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for managing deployed electronic documents comprising:
attempting to access a network managed document located locally at a client via a document handler at the client, the network managed document having been deployed in a network prior to the attempt by a remotely located document manager that controls access to the network managed document, the network managed document includes a plurality of data sections, each data section including content and section specific access rights for locally accessing and altering the included content of each data section, wherein the document handler attempts to access the network managed document through a proxy at the client between the network managed document and the document handler;

automatically conveying a data probe from the proxy at the client to the remotely located document manager responsive to the attempt to access the network managed document at the client, wherein the data probe is a request for access rights to the network managed document and includes data specific to the network managed document and identification information of at least one of the client or a user of the client attempting to access the network managed document to allow the remotely located document manager to determine access rights of the client or user for each of the plurality of the data sections;

responsive to conveying the data probe, receiving at the proxy of the client a management command from the document manager, the management command indicating access rights specific to the client or user for each of the plurality of data sections of the network managed document at the client based on the data included in the data probe; and locally and automatically performing a management action at the client by the proxy for the network managed document allowing access to the network managed document by the document handler at the client in accordance with the access rights indicated in the received management command, wherein the access rights include access rights to alter at least one of the data sections at the client.

2. The method of claim 1, wherein the network managed document is able to be utilized by a local application running on the client when a connection to the remotely located document manager is unavailable and wherein the alteration of the at least one data section is not saved to the network managed document until the remotely located document manager becomes available.

3. The method of claim 2, wherein a time-out condition is imposed upon the use of the network managed document so that when a connection to the document manager remains unavailable after the time-out condition is satisfied, access to the network managed document is automatically restricted.

4. The method of claim 1, wherein before the conveying step, the network managed document includes content and access rights for locally accessing the included content, wherein said at least one management action automatically alters at least one of the content and the access rights.

5. The method of claim 1, wherein the proxy is implemented at the client via a set of instructions embedded in the network managed document.

6. The method of claim 1, wherein machine-readable programmatic instructions that cause a machine to convey of the data probe, process the received management command, and initiate the performing step in accordance with the method are embedded within the network managed document.

7. The method of claim 1, further comprising:
providing a deployed document engine upon a machine that performs the locally accessing step, wherein use of the network managed document requires an active involvement of the deployed document engine, wherein machine-readable programmatic instructions that cause a machine to convey of the data probe, process the received management command, and initiate the performing step in accordance with the method are executed by the deployed document engine.

8. The method of claim 1, wherein the at least one management action adjusts deployed document rights to the determined access rights.

9. The method of claim 1, wherein said steps of claim 1 are steps performed by at least one of a service agent and a computing device manipulated by the service agent, the steps being performed in response to a service request.

10. A method for controlling access rights of a network managed document located at a client, comprising:
attempting to locally access the network managed document at the client via a document handler at the client, the network managed document, having been deployed in a network by a remote document manager, includes a plurality of data sections, each data section including content and section specific access rights for locally accessing and altering the included content of each data section, wherein the document handler attempts to access the network managed document through a proxy at the client between the network managed document and the document handler;

responsive to attempting to access the network managed document at the client, automatically requesting access rights from the remote document manager by the proxy of the client to alter at least one of the data sections at the client;

responsive to automatically requesting access rights, receiving access rights at the proxy of the client from the remote document manager for each of the plurality of data sections of the network managed document, the access rights allowing the client to alter the at least one data section in response to the requesting step;

comparing, by the proxy, access levels associated with the network managed document against the received access rights at the client;

granting, by the proxy, access to the at least one data section of the network managed document at the client based upon the results of the comparing step; and altering the at least one data section at the client via the document handler.

11. The method of claim 10, wherein requesting access rights includes identification information of a user of the client.

12. The method of claim 10, further comprising:
receiving a management command from the document manager, wherein the management command includes data relating to the results upon that is used by the granting step; and
locally and automatically performing at least one management action for the network managed document in accordance with the received management command, wherein said at least one management action automatically alters content of the deployed electronic document.

13. The method of claim 10, wherein the proxy is implemented at the client via a set of instructions embedded in the network managed document.

14. The method of claim 10, further comprising:
providing a deployed document engine upon a machine that performs the locally accessing step, wherein use of the network managed document requires an active involvement of the deployed document engine, wherein machine-readable programmatic instructions that cause a machine to request the access rights and to locally utilize the granted access rights are executed by the deployed document engine.

15. The method of claim 10, further comprising, responsive to altering the at least one data section, transmitting a message from the client to the remote document manager including an update to the network managed document, wherein the update is a result of the altering.

16. A network managed document comprising:
- a plurality of data sections, each section including content, wherein at least one of the plurality of data sections is a locked data section and at least one of the plurality of data sections is an unlocked data section; and
- a plurality of section-specific access levels, wherein access to locally alter any of the plurality of data sections at a client accessing the network managed document is selectively granted for the data sections based upon comparisons between the associated section-specific access levels and access rights granted to a proxy of the client by a remotely located document manager that has deployed the network managed document in response to a request from the proxy of the client to the remotely located document manager to locally access the network managed document sent by the client upon a document handler at the client attempting to access the locked data section, and wherein the request is not sent when the client access the unlocked data section, wherein the proxy operates between the document handler and the network managed document.

17. The network managed document of claim 16, wherein the remotely located document manager is configured to perform at least one management action upon the networked managed document, wherein said at least one management action automatically alters content of at least one of the data sections.

18. The network managed document of claim 16, further comprising:
- a set of data containing access information and restrictions for the deployed electronic document as established in accordance with access rights granted by the document manager as of a period when a connection was last established with the document manager, wherein when a network connection between the networked managed document and the remotely located document manager is unavailable, the network managed document is able to be locally accessed in accordance with access information and restrictions contained within the set of data.

19. The networked managed document of claim 16 further comprising a set of instructions embedded in the network managed document to implement the proxy at the client.

20. The networked managed document of claim 16 comprising:
- a programmatically encoded dependency between the networked managed document and a deployed document engine operating as the proxy, wherein a use of the networked managed document requires interactions involving the deployed document engine, and wherein said deployed document engine includes a plurality of machine-readable programmatic instructions that cause a machine attempting to access the networked managed document to automatically convey a data probe to the remotely located document manager and to perform at least one management action responsive to a management command received from the document manager in response to the data probe, wherein one management action applies the access rights to the networked managed document.

* * * * *